July 28, 1964    H. D. GOLDBERG ETAL    3,142,796
METHOD AND APPARATUS UTILIZING A CONDUCTOR LOOP IN
A MAGNETIC FIELD FOR MEASURING AREAS
AND RELATED QUANTITIES
Filed Aug. 18, 1953     3 Sheets-Sheet 1
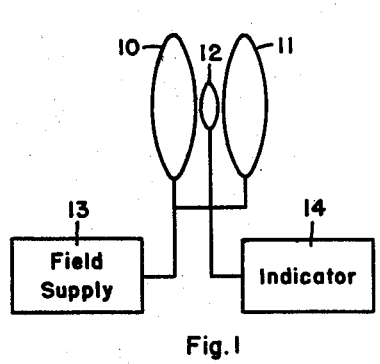
Fig. 1
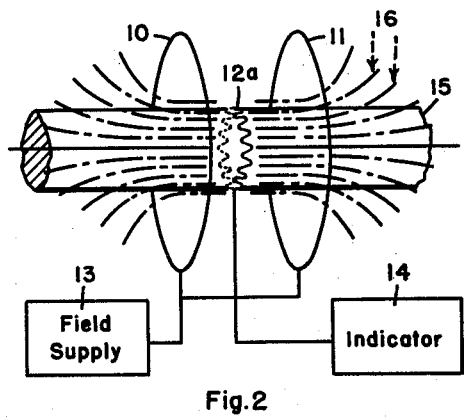
Fig. 2
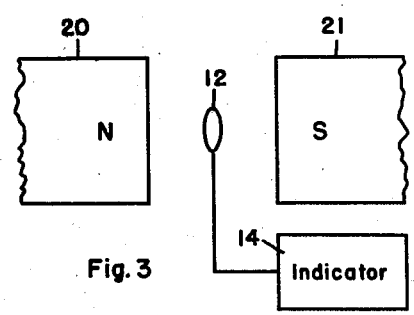
Fig. 3
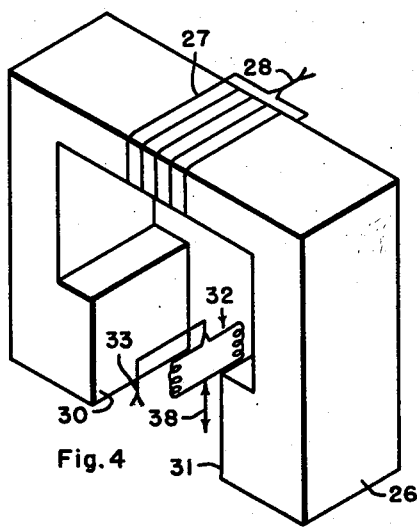
Fig. 4
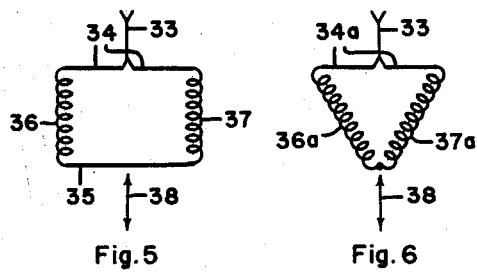
Fig. 5     Fig. 6
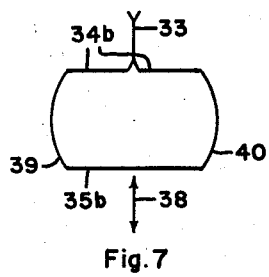 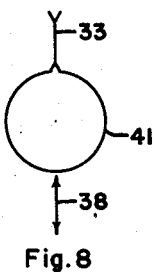 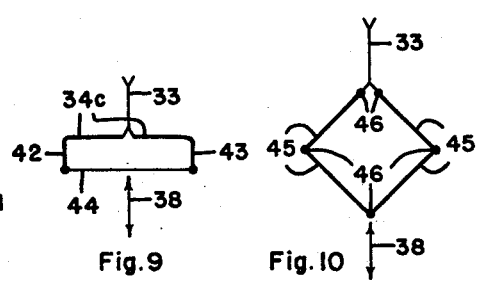
Fig. 7     Fig. 8     Fig. 9     Fig. 10
INVENTORS
Harold D. Goldberg
Milton J. Goldberg July 28, 1964   H. D. GOLDBERG ETAL   3,142,796
METHOD AND APPARATUS UTILIZING A CONDUCTOR LOOP IN
A MAGNETIC FIELD FOR MEASURING AREAS
AND RELATED QUANTITIES
Filed Aug. 18, 1953   3 Sheets-Sheet 2

INVENTORS
Harold D Goldberg
Milton I. Goedberg

July 28, 1964 H. D. GOLDBERG ETAL 3,142,796
METHOD AND APPARATUS UTILIZING A CONDUCTOR LOOP IN
A MAGNETIC FIELD FOR MEASURING AREAS
AND RELATED QUANTITIES
Filed Aug. 18, 1953 3 Sheets-Sheet 3

INVENTORS
Harold D Goldberg
Milton S Goldberg

United States Patent Office
3,142,796
Patented July 28, 1964

3,142,796
METHOD AND APPARATUS UTILIZING A CON-
DUCTOR LOOP IN A MAGNETIC FIELD FOR
MEASURING AREAS AND RELATED QUAN-
TITIES
Harold D. Goldberg, 3336 Hull Ave., Bronx, N.Y., and
Milton I. Goldberg, New Rochelle, N.Y. (Barrett
Road, Katonah, N.Y.)
Filed Aug. 18, 1953, Ser. No. 374,868
4 Claims. (Cl. 324—71)

This invention relates to instruments for measuring areas, volumes and related quantities, this being a continuation-in-part of our application filed December 21, 1948, Serial No. 66,523, which matured on August 18, 1953, into Patent No. 2,649,573.

Among the important objectives of our invention is that of measuring cross-sectional areas of objects, both inanimate and animate. And in this aspect of our invention it is an important object to avoid the complications and the errors, arising from various conditions of temperature and other conditions, that frequently occur with the use of certain conventional measuring instruments. In the accomplishment of these objectives we employ, in accordance with our invention, electro-magnetic induction means embodying a conducting pick-up coil encircling or embracing the member or region being measured, or a portion thereof, the coil and part which is being measured being placed within a uniform alternating magnetic field—the principle being that the voltage induced in the coil by the field is directly proportional to the area enclosed by the coil. This method has been found to be accurate, capable of operation under conditions which would render other conventional measuring apparatus impracticable or inaccurate, and adapted for a great variety of uses, as will more clearly hereinafter be set forth.

It is also within the contemplation of our invention to provide a device capable of measuring changes in cross-sectional area, such as may occur in portions of a body resulting from muscular contractions, etc., or in connection with fluid flow in elastic tubes or in members of an animate body.

In connection with the last-mentioned aspect of our invention, it is a further object to provide a device capable of measuring the pressure, velocity of pulsatile flow, the rate of flow, etc., and the behavior of tubes under conditions of stress, temperature, etc., in the field of fluid dynamics.

Another object of our invention is to enable the ready and convenient measurement of volumes of solid or tubular bodies, an objective which is accomplished by our invention by the integration of cross-sectional areas with respect to the length of the section being measured.

Yet another object of our invention is to enable the measurement of rates of change of cross-sectional area and related quantities, an objective which may be accomplished by our invention by using steady magnetic fields for direct indications of rates of change of such quantities as well as by the differentiation of such quantities.

And in further connection with the adaptability of our invention to the measurement of fluid flow, it is a further objective to accomplish such measurement by storing the effluent and measuring the rate of increase of its volume, which equals the rate of flow—an application thereof being in the field of plethysmography, the measurement of the flow of blood in human or animal limbs or other parts of the anatomy by means of volume change indications or recordings.

It is also within the contemplation of our invention to effectuate the measurement of position of an object by relating such position to the projected area of a pick-up coil in an alternating magnetic field. By the use of steady and alternating fields, displacement, velocity, force, and related quantities may be measured, as well as various functions of these quantities, by methods including the use of suitable pick-up structures and non-uniform fields—an application of this aspect of our invention being in the field of general strain gauging. Among the advantages of this method are that very little force is required to deflect the pick-up, that a very wide range of function relating output voltage and position and related quantity is possible, that the associated circuits are simple and may be made free from drift, and that devices incorporating the method are easily produced.

Another object of our invention is the provision of a device capable of general measurement of irregular areas, such as those defined by boundary lines, for example, mathematical and other curves, maps, charts, etc. In this aspect of our invention the conductor defining the area, instead of being the pick-up coil above mentioned, is a line of conductive material, which may be elastomeric, or a length of conductor—the voltage induced in this conductor when placed in a uniform alternating magnetic field being directly proportional to the defined area. For performing mathematical operations on curves, non-uniform magnetic fields, as well as curves outlined on deformable sheets, may be employed. This aspect of our invention has application in the fields of mathematics, computation, cartography, and others, as well as in the measurement of elastic members, including the study of stresses.

Yet a further object of our invention is to provide a pick-up coil particularly adapted for adjusting embracing engagement with or encirclement of the surface of a member to be measured, and so constructed and arranged whereby the voltage operatively induced therein will be affected only by the change in the embraced area, and will remain substantially unaffected by other changes in dimensions, proportions and shape of the coil during its expansion.

Still a further object of our invention is to provide a pick-up coil particularly adapted for measurement of any quantity which may cause a change in the number of lines of force of a magnetic field enclosed by said pick-up.

Other objects, features and advantages will appear from the drawings and description hereinafter given.

Referring to the drawings,

FIGURE 1 is a schematic drawing showing field and pick-up coils and their electrical connections in one form of our invention.

FIGURE 2 is a perspective view of a member being measured, with a pick-up coil operatively placed thereover, the drawing further schematically illustrating the field coils and electrical connections, as well as the magnetic field.

FIGURE 3 is a fragmentary schematic drawing showing said field coils being replaced with pole pieces of a permanent magnet.

FIGURE 4 is a perspective semi-diagrammatic view of an electromagnet and pick-up coil and their electrical connections for measuring displacement, velocity, and related quantities.

FIGURES 5 through 16 are schematic drawings showing various forms of pick-ups which may be used with a field structure such as that of FIGURE 4, for measuring displacement, velocity, and related quantities.

Figure 11:
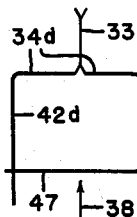

As aforesaid, the essence of our invention resides in the use of electromagnetic induction to perform various measurements.

In FIGURE 1, the field producing means are shown as field coils 10 and 11, which are illustrated as being of substantially equal diameters and as flanking the pickup 12, the latter being shown as smaller than the field coils, disposed midway there-between, and adapted for adjusting engagement with a member to be measured. The pick-up 12 may be so constructed that an increase and decrease in its cross-sectional area can be produced without the employment of appreciable force. The field producing means, which may be Helmholtz coils, solenoids, or other magnetic field producing devices, including those using cores of magnetizable materials, are operatively energized by any means known in the art—such as by field supply 13. As will be described below, alternating, steady, or combinations of alternating and steady magnetic fields may be employed for various measurements. If an alternating magnetic field is to be produced, the field supply may comprise an oscillator and power amplifier, and if a steady magnetic field, a source of direct current, for example, a battery. A steady magnetic field may also be produced by the use of a permanent magnet. A magnetic field containing both alternating and steady components may be produced, for example, by supplying field coils 10 and 11 with both alternating and direct currents, simultaneously or sequentially, or with a varying direct current. The energization of the field coils produces a magnetic field, the central portion of which extends substantially parallel to the axes of the field coils and pick-up, and is intercepted by the pick-up. Since the member being measured, such as the cylindrical member 15 of FIGURE 2, extends axially through the pick-up, said member is parallel to the magnetic field. And as the pick-up 12 is flexible and adjustable, according to a construction to be hereinafter described, any change in the member being measured will cause a corresponding change in the pick-up coil, thereby changing the number of lines of force enclosed.

When an alternating magnetic field is employed, there will be induced within the pick-up 12 a voltage proportional to the number of lines of force of the field enclosed, which may be observed by equipment such as indicator 14, which may be a sensitive voltmeter, electrically connected to the pick-up. And if the field is uniform the induced voltage will be proportional to the cross-sectional area of the member.

Any change in the cross-sectional area of the member being measured will cause a corresponding change in the cross-sectional area of the pick-up coil, thereby changing the number of lines of force of the field enclosed by the pick-up, and hence correspondingly changing the induced voltage. Thus cross-sectional area changes as well as cross-sectional areas may be measured.

Should it be desired to measure the volume of a member, cross-sectional areas may be integrated with respect to the length of the member, so that volumes and volume changes may also be measured. And by employing suitable circuits the induced voltages may be differentiated, so that indications may be obtained proportional to the rates of change of these quantities.

When a steady magnetic field is employed, there will be induced within the pick-up 12 a voltage proportional to the rate of change of the number of lines of force of the field enclosed. If the field is uniform, the induced voltage will be proportional to the rate of change of cross-sectional area of the member, and thus rates of change of cross-sectional area may be indicated directly. Correspondingly, rates of change of cross-sectional area may be integrated with respect to the length of the member, for measurement of rates of change of volume. And by employing suitable circuits the induced voltages may be integrated, so that indications may be obtained proportional to the changes of these quantities. The use of steady fields thus provides an alternate method of measurement. Also, these methods may be used in combination, by the use of magnetic fields with both alternating and steady components. By suitably employing the voltages developed in this manner, areas and volumes, their changes, and their rates of change may be determined most conveniently.

The specific pick-up coil 12a illustrated in FIGURE 2 consists of a single turn of fine-gauge conducting wire, although it is within our contemplation to employ, where necessary, a pick-up arrangement having a plurality of adjacent coils or a coil with a plurality of turns. The wire of the coil is of soft temper, the wire being of wavy configuration substantially throughout its entire extent—the bends which form the wavy configuration extending generally in the direction of the axis of the pick-up coil, substantially parallel to the surface of member 15. Hence, if pick-up coil 12a is in embracing engagement with the peripheral surface of member 15, it will change its cross-section therewith if the cross-section of member 15 changes. Resulting changes or deformations of the wavy portion of coil 12a do not as a practical matter affect the voltage induced therein, since if the member is a cylinder, these represent changes substantially in a direction parallel to the magnetic field, represented by the lines 16, and if the member is not of uniform cross-section, the compensating or opposing changes in the wavy portions of the pick-up coil produce correct average values. Thus such a pick-up coil changes its cross-sectional area together with changes of the embraced member being measured, and does not introduce extraneous factors which may have an effect on the induced voltage. Alternate constructions include forming the conductor into other yieldable configurations such as coil springs, as well as the use of other forms such as various sliding and jointed structures.

In FIGURE 3 the field coils are shown replaced by a permanent magnet, whose poles are 20 and 21, flanking the pick-up 12, which is electrically connected to the indicator 14.

Electromagnetic induction may also be employed to effectuate the measurement of any quantity which may cause a change in the number of lines of force of a magnetic field enclosed by a pick-up conductor. For example, a displacement may be measured by relating to it a change in the projected area of a pick-up in an alternating magnetic field. In corresponding manner, using steady and alternating fields, this method may be employed for measuring position, displacement, velocity, and related quantities, and for producing output voltages which are various functions of these quantities.

A general procedure which may be followed is to cause the projected area of a pick-up in the magnetic field to be varied according to the quantity being measured. The magnetic fields may be alternating, steady, or combinations of alternating and steady, according to the indication desired. In the above example, to measure displacement, an alternating magnetic field may conveniently be employed, while a steady magnetic field may be employed to measure velocity.

FIGURE 4 illustrates a field structure and pick-up whose area in the magnetic field is varied according to a displacement. The electromagnet 26 produces a magnetic field between pole pieces 30 and 31, whose nature depends on the current through the field coil 27, connected to a field supply through leads 28. The area inclosed by the pick-up 32 varies according to the magnitude and direction of the displacement 38, thus changing the number of lines of force inclosed by the pick-up.

With reference to voltages induced in the pick-up of FIGURE 4, as well as in those described below, when an alternating magnetic field is employed the induced voltage will be proportional to the number of lines of force enclosed. Hence changes in cross-sectional area, caused by displacements, will result in changes in the induced voltage. And if the change in the number of lines of force enclosed is proportional to the displacement, the change in the induced voltage will likewise be proportional to the displacement. And when a steady magnetic field is employed the induced voltage will be proportional to the rate of change of lines of force enclosed. And again, if the change in the number of lines of force enclosed is proportional to the displacement, the induced voltage will be proportional to the velocity of the displacement.

Illustrative of some of the types of pick-ups which may be employed are the constructions shown in FIGURES 5 through 16, in which heavy lines represent rigid and light lines non-rigid conductors. In FIGURES 5 through 13, the direction of the magnetic field is at an angle to the plane of the paper, preferably at a right angle. These figures show the pick-ups consisting of single strands of conductor. Alternatively they may consist of many strands, forming coils for increased output.

The areas of the pick-ups may be made variable by employing numerous constructions. These include structures employing conductors formed into yieldable configurations, such as coil springs (FIGS. 5 and 6) and flexible shapes (FIGS. 7 and 8), the use of conductors which are inherently extendable and flexible (FIG. 9), and the use of other forms such as jointed structures (FIG. 10), and structures employing sliding contacts (FIG. 11).

FIGURE 5 is another view of pick-up 32 of FIGURE 4 wherein rigid conductors 34 and 35 are joined by coil springs 36 and 37, and leads 33 are connected electrically to an indicator, such as indicator 14 of FIGURE 1. Displacement 38, applied to conductor 35, causes a change in the number of lines of force of the field enclosed.

FIGURE 6 is a modification of FIGURE 5 wherein 34a is a rigid conductor, while coil springs 36a and 37a are joined together, to which juncture displacement 38 is applied.

In FIGURE 7, 34b and 35b are rigid conductors joined by flexible conductors 39 and 40. Displacement 38 is applied to conductor 35b.

In FIGURE 8 the pickup is formed entirely of flexible conductor 41, which may be of any suitable shape, with displacement 38 applied thereto.

In FIGURE 9 the displacement is applied to flexible, extendable conductor 44 joined to rigid conductors 42 and 43, which in turn are joined to conductor 34c.

FIGURE 10 illustrates a jointed structure comprising rigid conductors 45 with joints 46, to one of which joints displacement 38 is applied.

FIGURE 11 illustrates the use of sliding contacts, rigid conductor 47, to which displacement 38 is applied, making sliding contact with rigid conductors 42d and 43d which are joined to conductor 34d. Rolling contacts and contacts with liquid conductors may be similarly employed.

Figure 12:
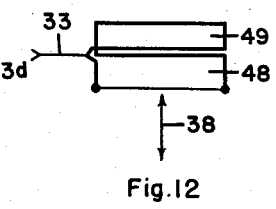

When using alternating magnetic fields, it is often convenient to balance out the voltage induced in an undeflected pick-up. FIGURE 12 shows a means of accomplishing this, applied in particular to the pick-up of FIGURE 9. To the voltage induced in loop 48, the pick-up loop, is added the voltage induced in loop 49, which is connected so as to oppose that in loop 48. Thus, if an equal number of lines of force is enclosed by each, the net output voltage is zero. The voltage induced within loop 49 may be brought to equality with that of loop 48 by adjusting its area, for example. In this manner an indication of zero may correspond with a displacement of zero. Balancing loop 49 need not be mounted alongside pick-up loop 48, but may be located in other positions, for example, in front or behind said loop 48.

Figure 13:
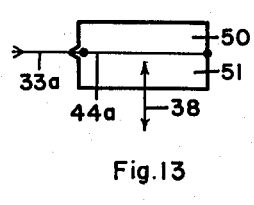

FIGURE 13 shows a construction in which an increase in cross-sectional area of pick-up loop 50 is accompanied by a decrease in that of pick-up loop 51 when conductor 44a is deflected downward by displacement 38. The output of the loops is intended for connection to a conventional differential amplifier by triple conductor leads 33a, so that here also, for initially equal areas 50 and 51, an indication of zero is obtained.

Figure 14:
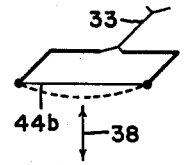

FIGURE 14 shows a modified application of the pick-up of FIGURE 9 in which the conductor 44b is deflected preferably at right angles to the plane of the undeformed pick-up loop by displacement 38, and the magnetic field is applied generally parallel to the plane of the pick-up loop, and at a right angle to the conductor. Thus the undeflected pick-up encloses no lines of force and so produces an indication of zero. Since the displacement is at an angle to the plane of the undeflected pick-up, a change in the displacement causes a change in the projected area of the pick-up in the field, and hence in the number of lines of force of the field enclosed by the pick-up. However, the construction of FIGURE 14 is sensitive to the induction of spurious voltages by stray fields which make an angle with the plane of the pick-up loop. These may be cancelled in a number of ways, including the use of balancing loops connected as shown in FIGURE 15 or connected as shown in FIGURE 12.

Figure 15:
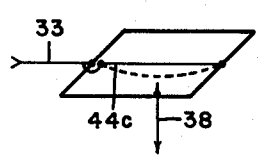
Figure 16:
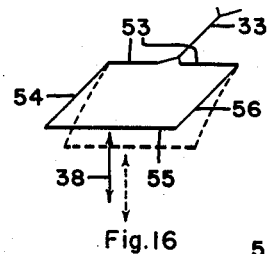

FIGURE 16 shows an additional pick-up form, in which the magnetic field may be applied as in FIGURES 14 and 15, but in which conductors 54 and 56 may undergo deflection when conductor 55 is displaced. Pickups of the forms of FIGURES 5, 6, 7, and 8 may be similarly operated. Various balancing arrangements may likewise be employed with these types of pick-ups.

Figure 17:
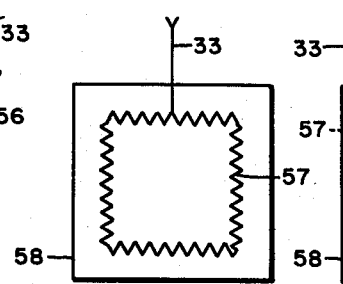
FIGURE 17 is a schematic drawing showing a pick-up adapted for attachment to a surface undergoing changes in dimensions.
Figure 18:
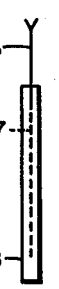
FIGURE 18 shows an end view of FIGURE 17.

FIGURE 17 shows a pick-up structure adapted for convenient attachment to a surface undergoing changes in dimensions, such as that produced by stresses. FIGURE 18 is an end view of FIGURE 17. The pick-up conductor 57, which is shown embedded within a yieldable material, may also be fastened to the surface of such material, which may be elastomeric, and which is preferably non-conductive. A pick-up conductor or a pick-up structure may be attached to the member being measured by various methods, including cementing, using pressure sensitive materials and embedding within. The shape of the area outlined by pick-up 57 is determined by the requirements of the measurement in conventional manner.

In general, if a uniform alternating magnetic field is employed, the induced voltage in a pick-up will be proportional to the area of the pick-up, and if a uniform steady magnetic field, to its rate of change of area. Hence a desired relation between the output voltage and the quantity being measured may be obtained by designing a pick-up so that its area or rate of change of area are properly related to the quantity being measured and employing respectively a uniform alternating or steady magnetic field.

Figure 19:
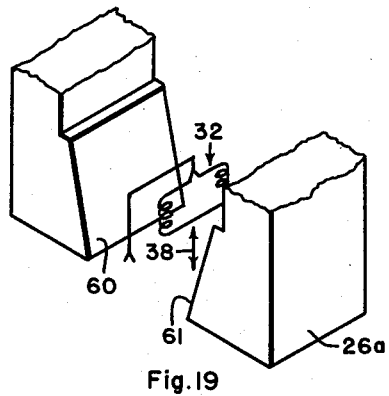
FIGURE 19 is a fragmentary semi-diagrammatic view of a pick-up and a pair of shaped pole pieces which may replace the pole pieces of FIGURE 4.

Correspondingly, non-uniform magnetic fields may be employed. In any alternating magnetic field, regardless of uniformity, the output voltage of a pick-up is proportional to the number of lines of force enclosed, and in any steady field, to the rate of change of lines of force enclosed. Hence the output voltage depends on both the field distribution and the relation of the area of the pick-up to the quantity being measured, so that suitable combinations of field distribution and pick-up design may be employed to establish desired relations between the output voltages and the quantities. The required field distributions may be obtained by conventonal methods, including proper shaping of pole pieces, as for example pole pieces 60 and 61 of FIGURE 19, which may be used with the magnetic structure and pick-up of FIGURE 4.

Forces and related quantities may be measured by employing elastic elements or similar means in conjunction with the above systems. Conductors having suitable elastic properties may be employed directly, for example, in the form of coil springs, for illustration in the manner shown in FIGURE 4. One elastic conductor which may be used for this purpose is beryllium copper. The configuration of the pick-up is chosen to meet the requirements of the application.

Figure 20:
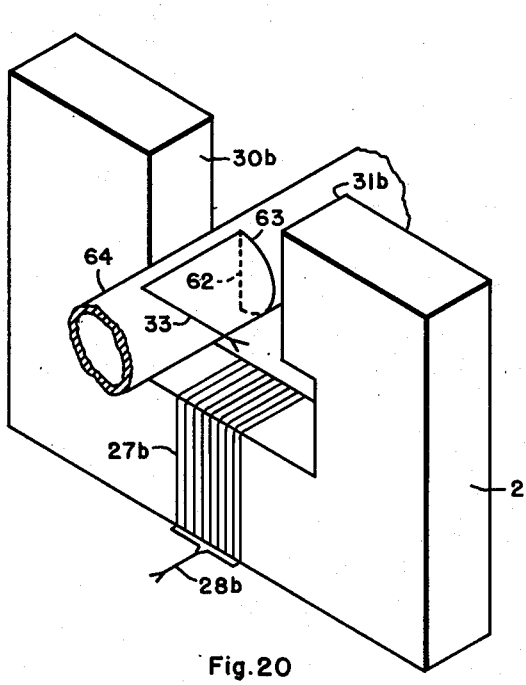
FIGURE 20 is a perspective semi-diagrammatic view of an electromagnetic field structure and pick-up, including electrical connections, as used in a flowmeter.

The forces and related quantities need not be applied at one point of the conductor only, but may be distributed along its length. One application is to a flowmeter, in which a taut or elastically suspended conductor is acted upon by a fluid, one construction of which is shown in FIGURE 20. Lines of force are produced between the pole pieces 30b and 31b of the electromagnet 26b, the nature of the magnetic field being determined by the field supply connected to field coil 27b by leads 28b. The lines of force are generally parallel to the plane of the area enclosed by pick-up 62 and rigid conductor 63, and at a right angle to pick-up 62, which is connected to an indicator by leads 33. Pick-up conductor 62 need not be a straight length of wire, but may be of various other forms for reasons including increased sensitivity, etc. Examples of such forms are the use of a conductor as a flat strip, or in the shape of a coil spring. The pick-up is contained in a tube 64, preferably non-conductive, through which passes the fluid whose flow is to be measured. As the flow of fluid increases, its drag increasingly deflects pick-up conductor 62, increasing the projected area of the pick-up, and hence the number of lines of force of the field enclosed.

Figure 21:
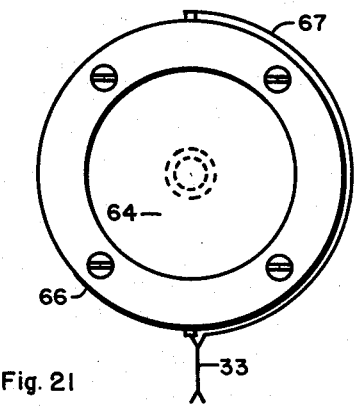
FIGURE 21 is a semi-diagrammatic front view and FIGURE 22 is a center section of a form of pressure measuring device.
Figure 22:
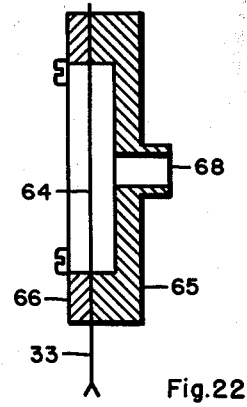
Figure 23:
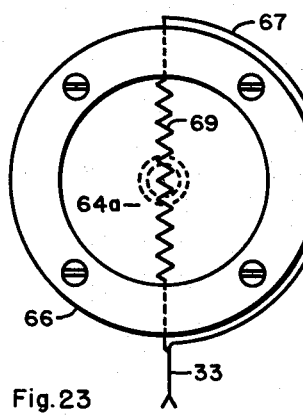
FIGURE 23 is a semi-diagrammatic front view and FIGURE 24 is a center section of another form of pressure measuring device.
Figure 24:
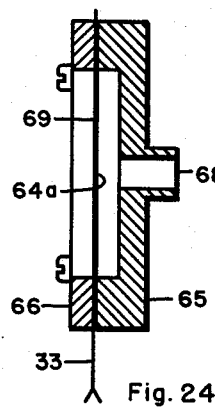

Another application is to a pressure measuring device, in which a diaphragm, which is deflected by the pressure being measured, serves as the moveable portion of a pick-up, one form of which is shown in FIGURES 21 and 22. In another example, a pick-up conductor may be mounted to the diaphragm, one form of which is shown in FIGURES 23 and 24. In FIGURE 21, the lines of force of the magnetic field produced in any known manner, for example, in the manner shown in FIGURE 20, are assumed parallel to the plane of the paper, and horizontal. FIGURE 22 is a center section view of FIGURE 21. The pick-up consists of conducting diaphragm 64, which may be corrugated if desired, held to body 65 by clamping ring 66. Contact is made to the top and bottom of diaphragm 64, connection being made to leads 33, with the aid of rigid conductor 67. Both clamping ring 66 and body 65 are preferably non-conducting. The inlet 68 is connected to the pressure to be gauged. A change in pressure causes diaphragm 64 to bow in or out, causing a variation in the number of lines of force enclosed within the pick-up loop according to the magnitude and direction of the pressure change.

FIGURES 23 and 24 illustrate a similar device in which diaphragm 64a, which is preferably a non-conductor, is clamped to body 65 by clamping ring 66, yieldable pick-up 69 being fastened to diaphragm 64a. Alternatively, pick-up 69 may be molded within diaphragm 64a. The electrical circuit is completed through rigid conductor 67 and connected to an indicator by leads 33. FIGURE 24 is a center section view of FIGURE 23. Operation is as described above for FIGURES 21 and 22. In FIGURES 21, 22, 23, and 24, the bodies are shown to be round, but any suitable shape may be used for this purpose.

Figure 25:
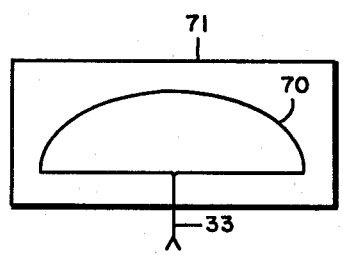
FIGURE 25 is a schematic drawing showing a mathematical curve, of which the area outlined is the quantity to be measured.

Electromagnetic induction may also be employed for the measurement of irregular areas such as those defined by boundary lines, for example, maps, charts and mathematical curves such as that shown in FIGURE 25. The area is outlined on sheet 71, preferably non-conductive, by any conductor, which may be a line of conductive material, such as conductive pencil, ink, metals in solution or suspension, elastomeric material, or a fine wire, which may be mounted on said sheet 71, and is provided with leads 33 which are connected to an indicator, such as 14 of FIGURE 1. The outlined area is placed within a uniform alternating magnetic field, in the general manner of the pick-up conductor 12 of FIGURE 1, or pick-up conductor 32 of FIGURE 4, the lines of force thus preferably making a right angle with the plane of said area.

In operatively employing the arrangement of FIGURE 25, it is apparent that a voltage will be induced within the conductor 70, such voltage being proportional to the area outlined by said conductor 70. The said indicator, electrically connected to leads 33 can be calibrated directly to indicate areas in the manner above described.

Figure 26:
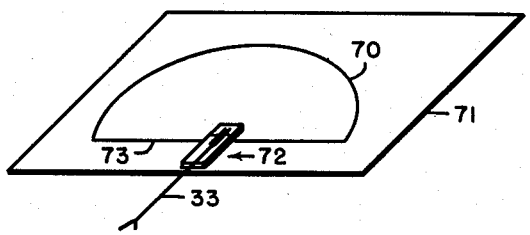
FIGURE 26 is a semi-diagrammatic perspective drawing of a mathematical curve together with a structure designed to simplify the attachment of connecting leads thereto when used in the measurement of areas outlined by curves.
Figure 27:
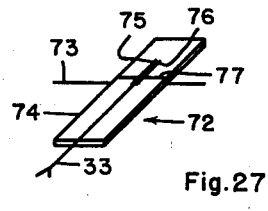
FIGURE 27 is an enlarged semi-diagrammatic perspective drawing of the lead attachment structure of FIGURE 26.

In order to accomplish these objectives, there are various forms and manners of establishing electrical contact with the pick-ups in accordance with our invention. For example, in FIGURE 26, leads 33 are attached to a strip of non-conductive material or tape 72, which may be transparent, it being applied to curve 70 to establish contact to the curve, for example at conductor 73. FIGURE 27 is an enlarged view of contact-making device 72, said leads 33 terminating in a pair of relatively short, closely-spaced parallel narrow strips or leads of conductive material 75 and 76, between which a barrier or removable mask may be placed to preclude possibility of a short circuit. Said material may be coated on one side with a pressure sensitive adhesive to conveniently hold it to a surface containing a curve; or other means of attachment may be used. Said material may be treated on the edges and the other side with such material as to allow a desirable conductive solid or liquid to adhere to said material. In use, said coated material is placed over conductor 73 of curve 70 in such manner that the parallel strips 75 and 76 intersect said conductor 73. The outline of the portion of said area covered by said material may then be marked with a suitable solid or liquid conductor, connecting said strips along the treated surface and edges 77 of said material, following the outline of conductor 73, until contact is made with the curve, which is facilitated by the use of transparent material. The curve is preferably interrupted under said material 72 so that the output voltage will not be shunted. In this manner an electrically conductive circuit is established from one of said parallel strips, around the perimeter of the area to be measured, and back to the other parallel strip. If a uniform alternating magnetic field is employed, a voltage will be induced proportional to the area enclosed.

Many variations of the above-described contact-making device may be constructed. As an example, the material which may be transparent as set forth may be made large enough so that the entire outline may be traced in conductive solid or liquid on said material.

If it is desired to perform mathematical operations on curves, in addition to measuring their areas, a number of procedures may be followed. For example, the sheet on which the area is outlined may be deformed in various ways, a yieldable material and conductor being used, to represent certain operations. Alternatively, the curves may be outlined on suitable surfaces, which do not lie in a plane.

Additional methods of performing mathematical operations on curves include the use of non-uniform fields, of distribution according to the operation to be performed. For example, the outlined area may be positioned within a non-uniform alternating magnetic field, such as that which may be produced by a field structure such as that of FIGURE 19, in the general manner of pick-up 32 of said FIGURE 19. In this manner, various computations may be rapidly and conveniently performed.

It should be understood that in any of the applications of electromagnetic induction for the making of various measurements, the pick-ups may be acted upon by various types of fields and combinations of fields. These may be steady or alternating, and they may differ in various ways, including amplitude, direction, distribution, and in being applied simultaneously, separately, or cyclically, and if alternating, in frequency and phase. Likewise, a single field system may act on several pick-ups or on a portion or portions of pick-ups.

In employing our system for plethysmographic purposes, as above indicated, the conventional venous occlusion method is used, permitting measurements of the total blood flow. This can be accomplished in the manner described in the previously filed applications, Serial Nos. 66,523 (Patent No. 2,649,573) and 66,524 (Patent No. 2,667,159). The same method renders our invention adaptable for the general measurement of fluid flow where elastic non-conducting tubes can be employed as a conduit for a fluid—by storing the effluent and measuring, by the method above described, the rate of increase of volume, which equals the rate of flow.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a method of measuring a rate of change in a cross-sectional area, the steps of providing a flexible expandable and contractible pick-up conducting coil, positioning said coil in contact with the area to be measured and adjusting the configuration of the coil to bring it into conformance with the configuration of said area, producing a uniform steady magnetic field across said coil and in a direction intercepting the plane of the area being measured, changing the area being measured, maintaining the configuration of said coil in conformance with said area during the operative change of the latter, whereby the coil will during said change move transversely across said magnetic field, whereby a voltage will be induced within the coil during said change, and measuring the voltage induced in the coil.

2. In a device of the class described for measuring the rate of change of the cross-sectional area of a member, a pick-up conductor having at least one loop, magnetic field means, a direct current source connected to said field means for establishing a steady magnetic field, said field means being positioned in the region of said loop and proportioned for producing a magnetic field in intercepting relation to said loop, whereby a voltage will be induced in said conductor when the cross-sectional area of said member changes, and voltage responsive means electrically connected to the said pick-up conductor, the said loop being adjustably deformable and conforming substantially to the configuration of said member being measured.

3. In a device of the class described for measuring the rate of change of the cross-sectional area of a member, a pick-up conductor having at least one loop, means for establishing a steady magnetic field, said loop being disposed within said field for interception thereby, whereby a voltage will be induced in said loop when the cross-sectional area of said member changes, and voltage responsive means electrically connected to the pick-up conductor, the said loop containing undulating portions and being adjustably deformable and conforming substantially to the configuration of said member being measured.

4. In a device of the class described for measuring the rate of change of the cross-sectional area of a member, a pick-up conductor having at least one loop, means for establishing a steady magnetic field, the said magnetic field having a uniform region, the said loop being disposed within said uniform region, whereby a voltage will be induced in said conductor when the cross-sectional area of said member changes, and voltage responsive means electrically connected to the pick-up conductor, the said loop being adjustably deformable and conforming substantially to the configuration of said member being measured.

References Cited in the file of this patent

UNITED STATES PATENTS

| | | |
|---|---|---|
| 1,270,920 | Botz | July 2, 1918 |
| 1,749,284 | Hayes | Mar. 4, 1930 |
| 1,749,285 | Hayes | Mar. 4, 1930 |
| 1,793,970 | Simon et al. | Feb. 24, 1931 |
| 2,233,886 | Cowley et al. | Mar. 4, 1941 |
| 2,410,222 | Lawrence | Oct. 29, 1946 |
| 2,411,403 | Wentz | Nov. 19, 1946 |
| 2,484,212 | Ferris et al. | Oct. 11, 1949 |
| 2,517,975 | Chapin | Aug. 8, 1950 |
| 2,559,988 | Noyes | July 10, 1951 |
| 2,563,413 | Ostrow | Aug. 7, 1951 |
| 2,649,573 | Goldberg et al. | Aug. 18, 1953 |
| 2,666,129 | Ellsworth | Jan. 12, 1954 |
| 2,667,159 | Goldberg et al. | Jan. 26, 1954 |
| 2,679,031 | Jaidinger | May 18, 1954 |
| 2,727,207 | Jones | Dec. 13, 1955 |

FOREIGN PATENTS

| | | |
|---|---|---|
| 123,346 | Great Britain | Jan. 29, 1919 |
| 671,812 | Great Britain | May 14, 1952 |